US005931878A

United States Patent [19]
Chapin, Jr.

[11] Patent Number: 5,931,878

[45] Date of Patent: Aug. 3, 1999

[54] COMPUTERIZED PROMPTING SYSTEMS

[75] Inventor: Stephen R. Chapin, Jr., Ellicott City, Md.

[73] Assignee: MinderSoft, Inc., Ellicott City, Md.

[21] Appl. No.: 08/699,067

[22] Filed: Aug. 9, 1996

[51] Int. Cl.[6] .............................. G06F 7/00; G06F 19/00

[52] U.S. Cl. ................................ 701/30; 701/24; 701/29; 701/33; 701/34; 340/438; 340/457

[58] Field of Search ................................ 701/29, 30, 24, 701/33, 34, 35, 36; 340/425.5, 438, 457, 457.4, 500, 501, 502; 180/271

[56] References Cited

U.S. PATENT DOCUMENTS 5,400,018 3/1995 Scholl et al. ............................ 701/33

5,557,268 9/1996 Hughes et al. ............................ 701/32

*Primary Examiner*—William A. Cuchlinski, Jr.
*Assistant Examiner*—Gertrude Arthur
*Attorney, Agent, or Firm*—Millen, White, Zelano, & Branigan, P.C.

[57] ABSTRACT

A computerized prompting system is especially useful for vehicular maintenance and includes a level of maintenance database with task schedules for selected vehicles and prompt frequencies for those tasks. A prompter initiates a display informing the user that a scheduled maintenance is due to be performed on a selected date and an Internet exchange connects the database to a service center. The system has a capability to print coupons and to receive and incorporate updates from manufacturers.

15 Claims, 6 Drawing Sheets

CARMINDER™ SCHEMATIC

COMPUTERIZED PROMPTING SYSTEMS

FIELD OF THE INVENTION

The present invention relates to computerized prompting systems. More particularly, the present invention relates to computerized prompting systems for activities such as maintenance of assets; life events, both singular and reoccurring; and management minders including minders for personal resolutions, such prompting systems being especially useful in vehicular maintenance.

BACKGROUND OF THE INVENTION

From the perspective of a maintenance-based business, customers desire organizational tools that simplify, automate, and add value to routine tasks, e.g., Quicken™. An example of such routine tasks is vehicular maintenance which has unclear requirements (what to do when, for which car), a high "hassle" factor (where do I go, how long, how often) and low perceived value (benefits are not felt immediately). There is a need for a system and method which provides an inexpensive, user friendly way to provide prompts for vehicular maintenance, as well as suggestions for locations to have it conducted, and for record-keeping when it is completed.

In the vehicular maintenance businesses increased frequency of visits results in increased profits and, for automobile owners and leasers, increased frequency of visits generally results in longer vehicle life and reduced operating cost due to a decrease in large repair bills. With the society in general, increased frequency of visits results in a healthier fleet with reduced air pollution and a lower accident rate. Barriers to increasing the frequency of visits are due to procrastination, forgetfulness and customers who do not understand the value of regular maintenance. For the automobile maintenance companies, business is becoming increasingly difficult because of numerous aggressive competitors who reduce each companies market share. An increase in visit frequency materially impacts business profitability.

With the increased competitiveness, customer retention becomes an increasingly difficult task. Accordingly, there is a need for a link with current customers and a need for a device to establish links with future customers. In this regard, there is a need for a device which enables targeted acquisition of likely customers from competitors which in turn causes competitors to offer increased value in services in attempting to retain their customers.

SUMMARY OF THE INVENTION

In view of the aforementioned needs and concerns, the present invention is directed to a new and improved computerized prompting system which is especially useful in notifying the owners of vehicles that scheduled maintenance is due.

In practicing the present invention, a predetermined and internal database is provided and is populated with maintenance tasks to be performed at selected intervals. The intervals are selected by the user to determine a prompt frequency. The prompt frequency is used to create a maintenance alert at the interval selected by the user.

In a further aspect, following the maintenance alert, the user also receives notification of the nearest maintenance facility with a marketing coupon for the maintenance due. Additionally, the user can also print out a listing of completed maintenance at any time. (This is especially helpful when, for example selling a car.)

In still another aspect, a calendar is available which permits the user to see future, as-yet-to-be prompted, maintenance due.

In a further aspect of the invention, the internal database is connected to an Internet exchange which in turn connects the internal data base to a service center for notifying the service center that a maintenance appointment is to be scheduled.

In a further aspect of the invention, the internal database is updated via the Internet exchange through an update interface.

In a further aspect, maintenance materials are ordered at the service center when the Internet exchange receives the notification that the user should be scheduled for an appointment.

In still a further aspect, the service center location database and marketing coupon are updated.

Additionally, the Internet exchange allows updating of the service center location and marketing coupon databases. It also has the capability to receive prompts for maintenance from Internet and convert them into alerts with instructions on the screen.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

The computerized prompting system in accordance with the present invention provides a simple maintenance reminder and scheduler for use by personal computer users. The user initially inputs the type of car, certain car components, the current mileage, the level of maintenance desired (e.g., is the maintenance high, medium, or low) and the amount of miles driven per year. In accordance with the present invention, a computer program estimates the miles driven and compares that to a maintenance data base. A maintenance reminder appears on the computer screen to remind the user that maintenance is needed. Exemplary of such an arrangement would be a user buying a new car on the first of the year. The user then adds the car to the database, inputting the average miles per year as well as the maintenance level to be performed. The software of the present invention knows that for an average maintenance schedule the oil should be changed, for example, every 3,000 miles and estimates that the car will reach 3,000 miles in three months. One week prior to the scheduled maintenance date, a reminder screen appears on the computer display after the user boots up the computer, reminding the user that an oil change is needed.

Figure 1:
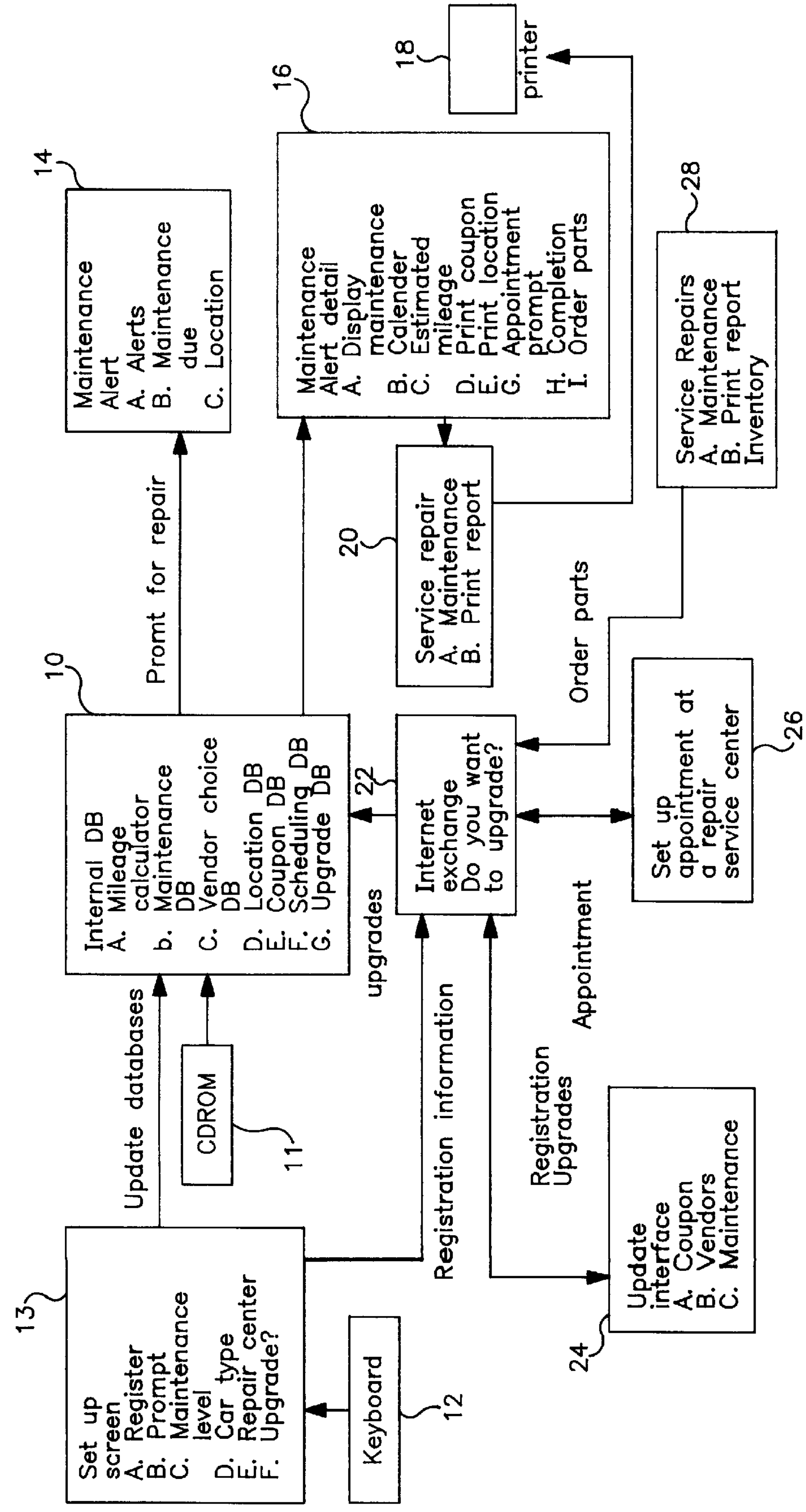
FIG. 1 is a schematic view illustrating a main routine for a vehicular maintenance system which includes an Internet link for linking a customer to a vehicular maintenance service.

Referring now to FIG. 1, there is shown an internal or personal profile database 10 of a personal computer. The internal database 10 is supplied with data from a CDROM flat disk 11 and is set up from a keyboard 12 interacting with a setup screen 13. The internal or personal profile database 10 is used to provide prompts and service center locations to a maintenance alert screen 14 and repair or maintenance information as well as marketing coupon information to a maintenance alert detail system 16 which is in turn connected both directly to a printer 18 and through a service repair history screen 20 to the printer 18.

The internal or personal profile database 10 is connected to an Internet exchange 22 which interfaces with external data bases such as an update interface 24, a service center interface 26 and an inventory interface 28. The Internet exchange 22 has registration information from the setup screen 13 and receives registration and upgrades from the update interface 24. In addition, the Internet exchange 22 is used to set up appointments for the user at the service center view 26. Inventory of fluids and parts at the service center 26 is controlled and minimized by the Internet exchange 22 notifying the center that maintenance on a vehicle is due.

Considering the system of FIG. 1 in more detail, initial inputs to the internal or personal profile database 10 are provided by the setup screen 13 which registers a personal profile of the user including the name, address and phone number of the user as well as the frequency of prompts, the desired maintenance level, the car type, car characteristics, the selected service center and whether or not upgrades are desired. The internal database 10 includes a mileage calculator as well as a maintenance database, a location database, a coupon database, a scheduling database and an upgrade database. Registration information is also supplied to the Internet exchange 22 which provides the user with upgrades if the user so requests. The Internet exchange 22 provides inputs to the upgrade database in the internal database 10 from the update interface 24 which provides information on new coupon configurations, venders and their locations, as well as maintenance changes.

The basic purpose of the system of FIG. 1 is to provide prompts for service. These prompts are displayed on the maintenance alert screen 14 from which the user is alerted that maintenance is due and notified of locations where the maintenance can be performed. The internal database 10 also generates service information to the maintenance alert detail screen 16 which displays the maintenance due, a calendar notifying the user of the date and the estimated mileage so that the user can compare the estimated mileage to the actual mileage. The maintenance alert detail screen 16 also generates a coupon via the printer 18 which has the location of the maintenance and also generates an appointment prompt and requests to order parts. The appointment is generated by the maintenance alert detail screen 16 through the Internet exchange 22 which facilitates setting up an appointment at the repair center 26. When the maintenance has been completed, the user so indicates the date of completion as instructed by the maintenance alert detail screen 16. An output from the maintenance alert detail screen 16 is displayed on a service repair history screen 20 which displays the maintenance performed and, if desired, prints a written report with the printer 18.

Figure 2A:
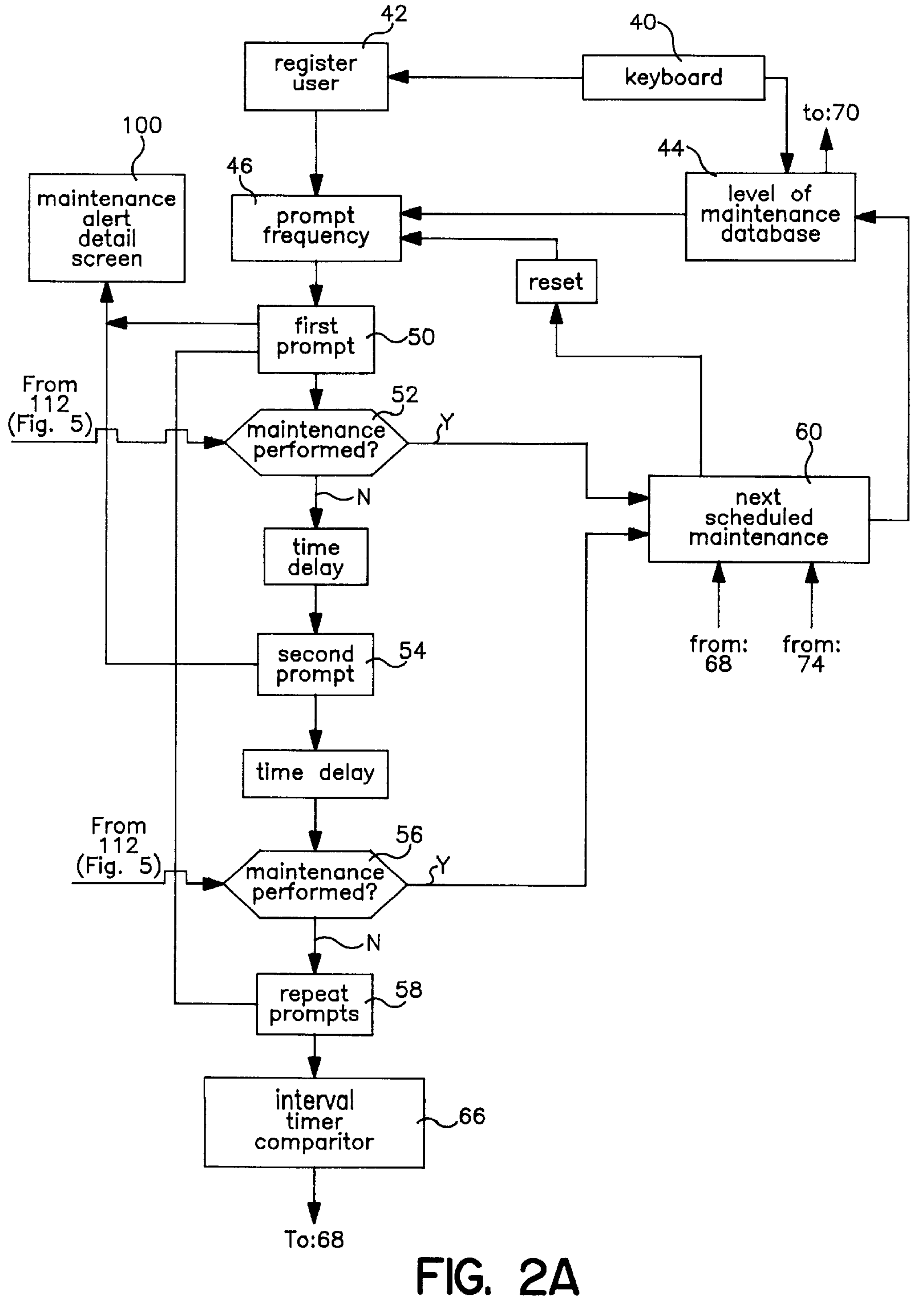
FIG. 2 is a flow chart of a routine for a prompting system in accordance with the present invention.
Figure 2B:
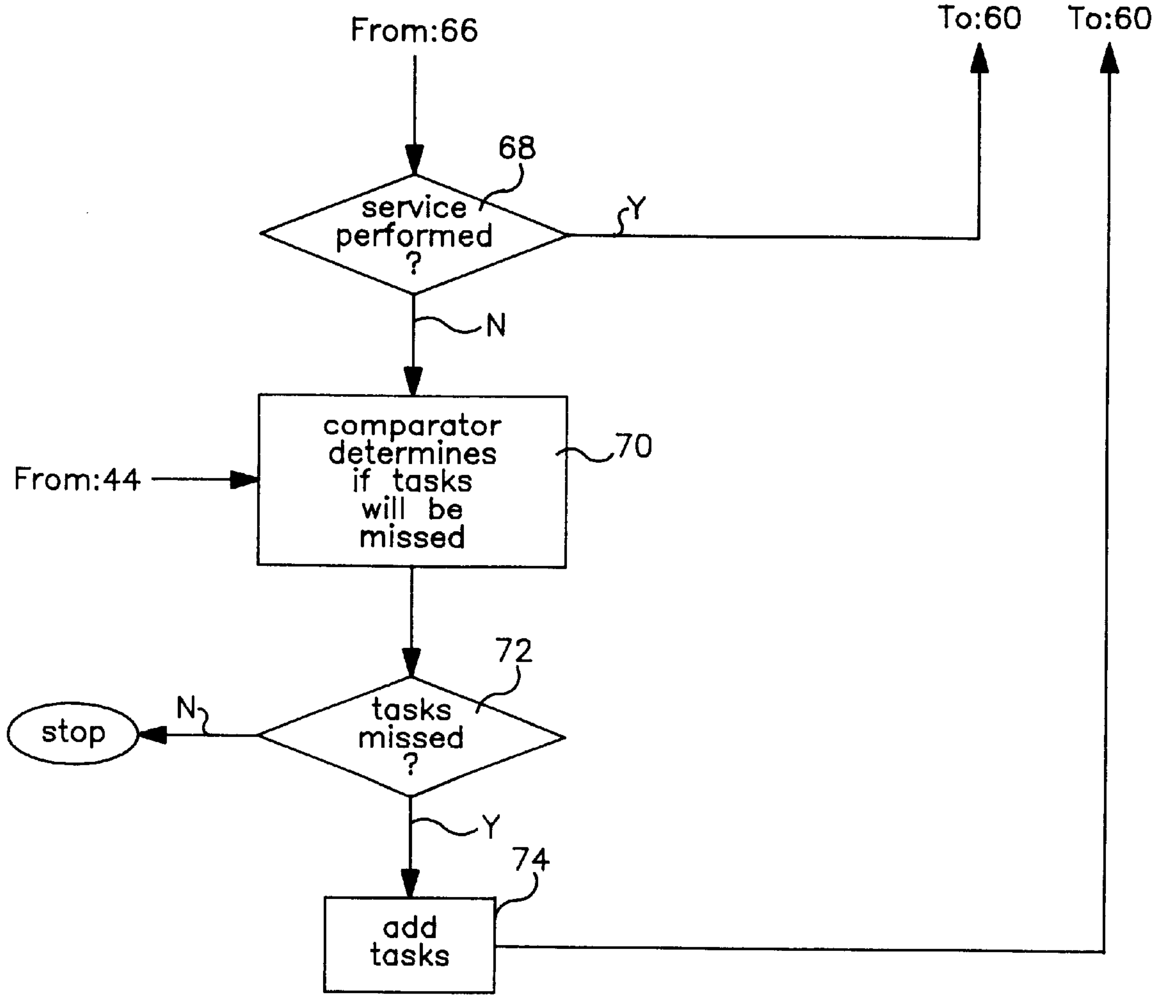

Referring now to FIG. 2 where a flow chart is shown illustrating the prompting procedure of a main routine, it is seen that the user initially registers name, address and phone number in a register 42 using the keyboard 40. The keyboard 40 also inputs the level of maintenance 44 which includes the prompt frequency 46. The prompt frequency 46 starts upon the user registering personal information and information on the automobile. The first prompt 50 issues a predetermined time, for example, one week, prior to the actual due date for the maintenance. For example, if an automobile is purchased on January 1 and the selected maintenance interval is every three months, then the first prompt 50 will issue February 21, one week prior to the scheduled maintenance due date.

The routine of FIG. 2 then inquires at 52 whether the maintenance has been performed. If the maintenance has not been performed, then a after a first delay, a second prompt 54 is issued. After an interval, the routine inquires at 56 whether the maintenance has been performed. If not, then the routine is returned at by a recycle step 58 to repeat the prompts. If the maintenance has been performed, then the decisions 52 and 56 initiate step 60 which resets the prompt frequency 46 for the next scheduled maintenance, the level of which is determined by the level of maintenance database 44.

If the user fails to perform the maintenance after a number of cycles of the return from recycle step 58, updates the system to accommodate the user's failure to have maintenance performed. The user's failure to perform maintenance may result from a number of situations such as the user not using the vehicle for a period of time or the user simply being dilatory with respect to maintenance schedules for the vehicle. This is accommodated by an interval timer step 66 in which a decision 68 is reached as to whether or not the service has been performed within the scheduled interval. If the service has been performed within the scheduled interview, the scheduler 60 resets the prompt frequency for the next scheduled maintenance.

If the decision 68 is "no", indicating that the service was not performed within the scheduled interval, the decision 68 activates a comparator 70 which compares the level of the maintenance missed with the next scheduled maintenance to determine if any tasks will be missed. For example, if the skipped level of maintenance indicates that the air filters should be changed or that wiper blades should be changed, then a decision 72 is with an add tasks step 74. The added tasks are looped back to the next scheduled maintenance so that the next scheduled maintenance does not overlook maintenance tasks which should be performed.

Figure 3:
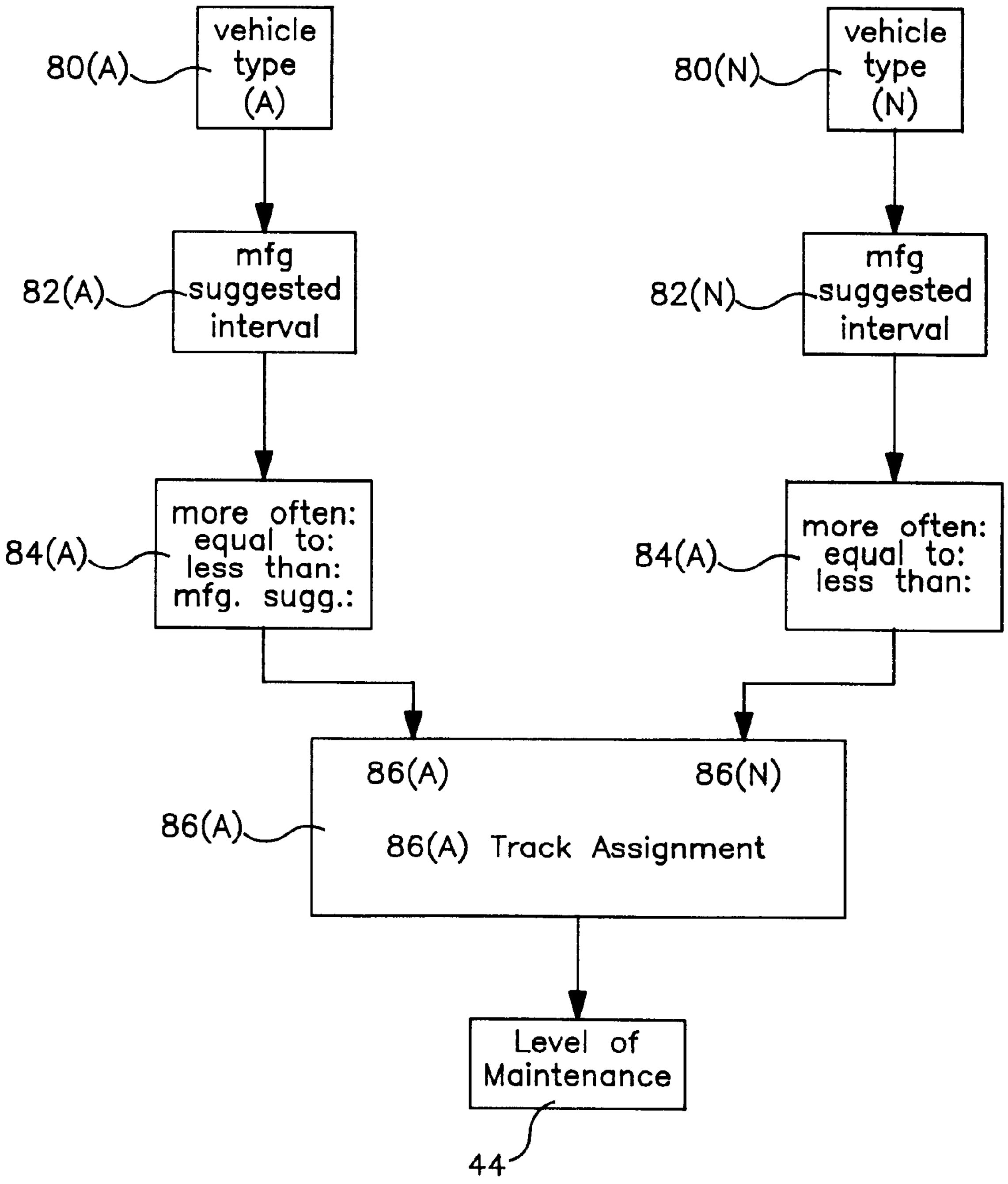
FIG. 3 is a flow chart of a subroutine of a level of maintenance inputs into the prompting system of FIG. 2.

Referring now to FIG. 3, a subroutine for the level of maintenance 44 is provided wherein vehicle types "a–n" which would include various vehicles, for example, two sedans from different manufacturers as well as a truck owned by the same user have prompts issuing from the same home computer. In this case, the vehicle types **80*a*–80*n* with manufacturers suggested intervals 82*a* and 82*n* are entered into the level of maintenance database 44 after being assigned tracks 86*a*–86*n***. With respect to each vehicle *a–n*, a decision is made with respect to prompt frequency as to whether the maintenance will be "more often", "equal to" or "less than" the manufacturer's suggested intervals of steps **82*a* and 82*n*. The subroutine of FIG. 3** allows the system to maintain a schedule for more than one car which is chosen from a list of cars and provides flexibility for a user to add a user created description field associated with each car.

If a used car is added, the user enters the current mileage, the date purchased and the miles on the car when purchased in the registration 42, and as with a new car, the estimated miles per year which can be verified or changed by the user. Moreover, with a used car, the user can enter the maintenance to date, if available.

Figure 4:
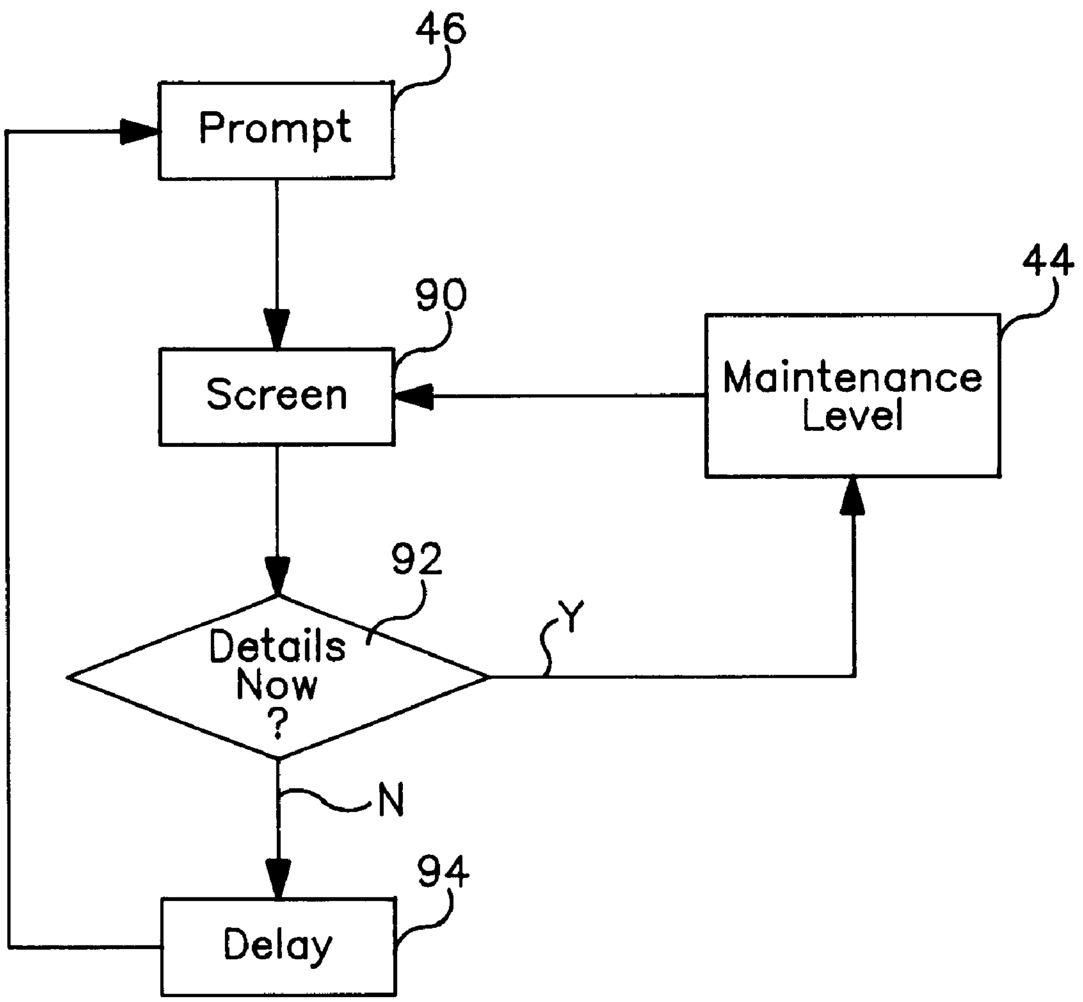
FIG. 4 is a flow chart of a subroutine for operating a maintenance alert screen.

Referring now to FIG. 4, where the subroutine for the maintenance alert detail screen 90 is shown, the output from the prompt 46 (also see FIG. 2) signals that maintenance is needed if the computer is booted up during a maintenance scheduled period (starting the week before the scheduled maintenance is to occur). An option 92 is then given the user to look at the details now by causing the maintenance level 44 to display the scheduled maintenance details on the screen 90 or to delay with delay step 94 which has a return to the prompt 46. The delay is selected by the user and may be of any reasonable duration period. For example, the delay may be 15 minutes so that the user can complete another task or maybe one to two days because the user is not interested in car maintenance as on the day that the prompt occurs.

Figure 5:
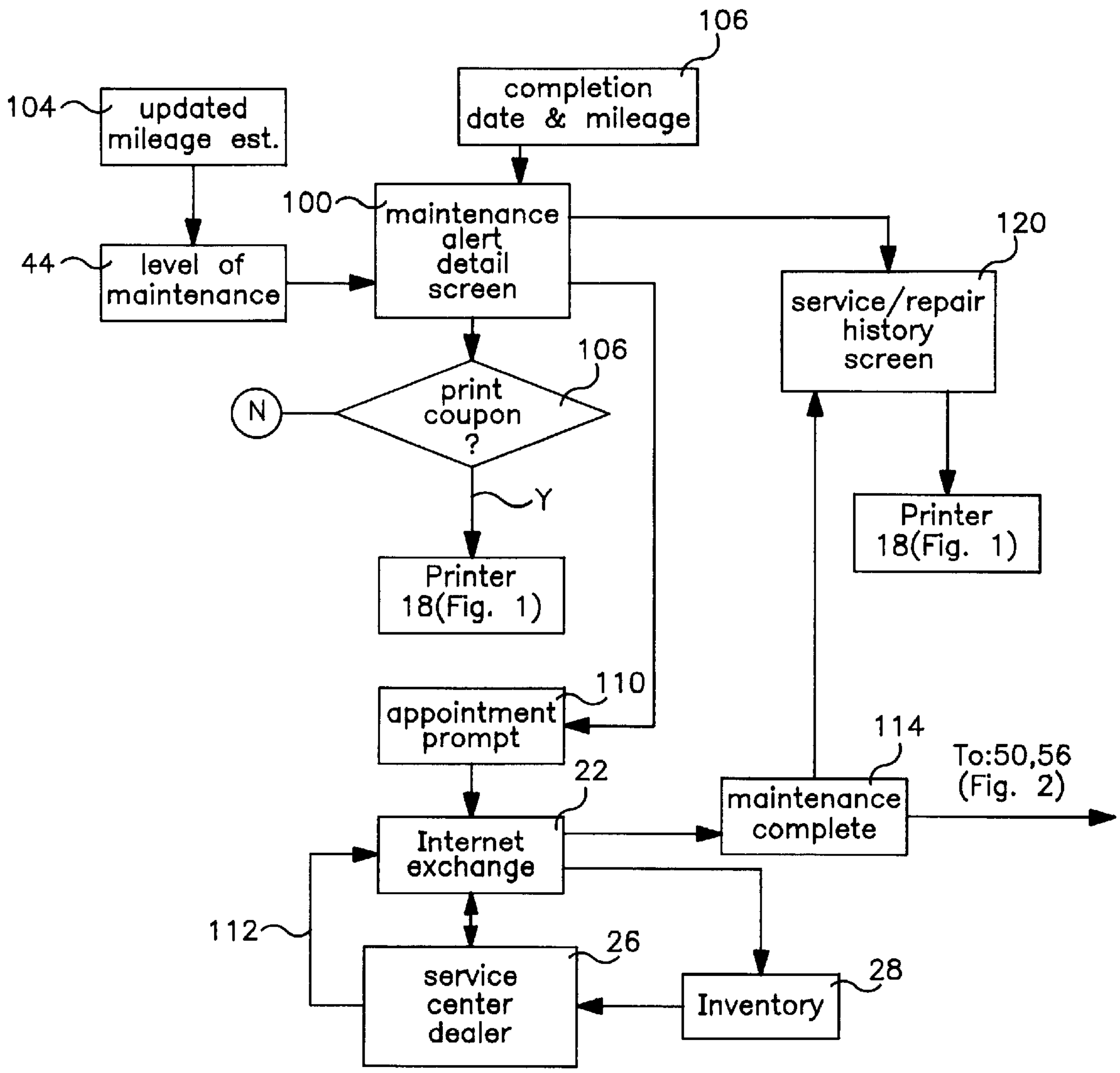
FIG. 5 is a flow chart illustrating a subroutine for a maintenance alert detail screen.

Referring now to FIG. 5, with a subroutine for the maintenance alert detail screen 100 is shown, the maintenance level data base 44 (see FIGS. 2 and 4) provides a description of the maintenance to be performed and the date by which the maintenance is needed to be done. The maintenance alert detail screen also has an input 102 for the mileage and date of maintenance completion. From the maintenance level data base, the subroutine for the maintenance alert detail screen 100 also displays all maintenance on a monthly calendar and the current estimated mileage for the car. The estimated mileage for the car may be updated by the user with the keyboard entry 104. The subroutine for maintenance alert detail screen 100 provides a decision 106 for activating the printer 18 (FIG. 1) to print coupons as well as a display of the nearest service center.

Referring now to FIG. 5 in combination with FIG. 1, the subroutine for the maintenance alert detail screen 100 also activates an appointment prompt 110 which is connected to the Internet exchange 22 (also see FIG. 1) through which an appointment is arranged with a dealer 26. In addition, the Internet interchange 22 notifies the service repair department 28 of the service center that inventory will be accessed so that inventory is available for the service appointment and so that inventory is not unduly depleted at the service center. This enables the service center to keep inventory at a relatively low level and thus operate its business more efficiently. It also enables mail ordering and delivery.

Upon completion of the maintenance, the dealer notifies the Internet exchange 22 over a return 112 that maintenance has been performed. The Internet interchange 22 then notifies the main routine of FIG. 2 through a maintenance complete notification 114 having an output to the decision steps 52 and 56 of FIG. 2.

The subroutine for the maintenance alert detail screen 100 also includes a subscreen display 120 of a service repair history 120. The service repair history screen 120 is activated by a maintenance complete notification 114 after notice from the Internet exchange 22. The service repair history screen 120 provides a description of the completed service, the date completed and mileage on the car when the service was completed as well as the cost of the maintenance service. If desired, a hard copy of the information appearing on the service/repair history screen 120 is produced by the printer 18.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A computerized prompting system comprising:

a profile data base having information specific to the user of the prompting system and being directly accessible by the user;

a level of maintenance data base including maintenance task schedules for selected vehicles including a vehicle identified with the user and prompt frequencies for those tasks;

a prompter for initiating a display informing the user that a scheduled maintenance is due to be performed on a selected date;

an Internet exchange external to the profile data base, level of maintenance data base and prompter, the Internet exchange being connected to a service center and optionally to an update database for notifying the service center that a maintenance appointment is due and for optionally providing the database with updates from the manufacturer.

2. The computerized prompting system of claim 1, wherein the level of maintenance database further comprises: subdata bases including a database of completed maintenance; a service center location database having all locations of service centers near the user; a calendar showing all previous maintenance due; and a marketing coupon database.

3. The computerized prompting system of claim 2 further including an updating input, the Internet exchange including updates to service center locations and updates to the marketing coupon data base.

4. The computerized prompting system of claim 1 further comprising an input to the Internet exchange for prompt instructions and an instruction in the Internet exchange for displaying the instructions.

5. The computerized prompting system of claim 1 further including a selector enabling the user to select the prompt frequency and level of maintenance desired.

6. The computerized prompting system of claim 5 further including a register for registering a plurality of vehicles in the same level of maintenance data base.

7. The computerized prompting system of claim 3, for registering specific vehicle characteristics which are maintenance prompted.

8. The computerized prompting system of claim 1 further including an alert screen display notifying the user that scheduled maintenance is due, a detailed screen of maintenance tasks for display after display of the alert screen, as well as the location of the nearest maintenance service center.

9. The computerized prompting system of claim 1 including a calendar screen which displays in calendar form maintenance previously due or completed and maintenance due in the future.

10. The computerized prompting system of claim 1 that includes a previously completed maintenance screen which also includes viewing and printing of completed maintenance.

11. The computerized prompting system of claim 10 that includes the capability to print the maintenance due with a marketing coupon specifically tied to that maintenance.

12. The computerized prompting system of claim 1 further including a connection to the inventory control of the service center for ordering maintenance materials therefrom upon notification that an appointment is to be scheduled.

13. The computerized prompting system of claim 1 further including the ability to schedule an appointment to have the maintenance completed, on line, at the nearest service center.

14. The computerized prompting system of claim 1 further including the ability to update the maintenance location and marketing coupon databases.

15. The computerized prompting system of claim 1 further including the ability to receive prompts for maintenance due or other messages from the Internet.

* * * * *